US012693172B2

(12) United States Patent
Zeng

(10) Patent No.: US 12,693,172 B2
(45) Date of Patent: Jul. 28, 2026

(54) FOOD TEMPERATURE PROBE

(71) Applicant: SHENZHEN TOPOS SENSOR TECHNOLOGY CO., LTD., Shenzhen (CN)

(72) Inventor: Zhaoting Zeng, Shenzhen (CN)

(73) Assignee: SHENZHEN TOPOS SENSOR TECHNOLOGY CO., LTD., Shenzhen (CN)

( * ) Notice: Subject to any disclaimer, the term of this patent is extended or adjusted under 35 U.S.C. 154(b) by 284 days.

(21) Appl. No.: 18/607,562

(22) Filed: Mar. 18, 2024

(65) Prior Publication Data

US 2025/0237560 A1 Jul. 24, 2025

(30) Foreign Application Priority Data

Jan. 24, 2024 (CN) .......................... 202420177577.9

(51) Int. Cl.
  G01K 13/00 (2021.01)
(52) U.S. Cl.
  CPC .................................... G01K 13/00 (2013.01)

(58) Field of Classification Search
  None
  See application file for complete search history.

(56) References Cited

U.S. PATENT DOCUMENTS 5,370,459 A * 12/1994 Culbertson .............. G01K 7/04
    29/595
2016/0007411 A1 * 1/2016 Busche ................ H05B 3/0047
    392/408
2022/0381624 A1 * 12/2022 Young .................... G01N 25/18

* cited by examiner

*Primary Examiner* — Erica S Lin
(74) *Attorney, Agent, or Firm* — JEEN IP LAW, LLC

(57) ABSTRACT

A food temperature probe includes a handle body, a probe body, a first pole, a first temperature sensing element, a power supply module, an antenna, and a circuit board. A second pole is disposed on the probe body. The interior of the handle body and the interior of the probe body are communicated to form an accommodating cavity, and the handle body and the probe body are connected by brazing. The circuit board is disposed in the accommodating cavity, and the first temperature sensing element is disposed in the accommodating cavity at an end thereof away from the handle body. The first pole, the first temperature sensing element, the power supply module, and the antenna are electrically connected to the circuit board.

10 Claims, 21 Drawing Sheets

FOOD TEMPERATURE PROBE

CROSS REFERENCE TO RELATED APPLICATION

The present disclosure claims priority to Chinese Patent Application No. 202420177577.9, filed Jan. 24, 2024, which is hereby incorporated by reference herein as if set forth in its entirety.

BACKGROUND

1. Technical Field

The present disclosure relates to the technical field of temperature probes, and particular to a food temperature probe.

2. Description of Related Art

Food temperature probes are mainly used as tools to measure the internal temperature of food, to timely ensure that the food reaches the appropriate temperature and doneness during the cooking process. In particular, when barbecuing meat, the use of a barbeque thermometer can ensure that healthy, delicious, and safe meat is barbecued, and therefore, a food thermometer is one of the important tools in each kitchen.

In the conventional food temperature probes, the probe body and the handle body are fixed by glue filling. When the rear end of the probe body is sleeved on the ceramic handle, radial positioning cannot be formed due to the need to leave a glue filling gap between the probe body and the ceramic handle. Since the probe body and the ceramic handle are mostly fixed by glue filling, radial positioning cannot be formed, which easily leads to the glue filling gap being too wide on one side and too narrow on the other side along the radial direction, or leads to even no glue filling gap on one side, resulting in no glue filling on one side and unstable connection. During the use of the product, external water vapor can easily enter through the gap, thus corroding the internal components of the probe and making the product unusable. Here are the specific details.

When the rear end of the probe body is sleeved on the ceramic handle, radial positioning cannot be formed due to the need to leave the glue filling gap between the probe body and the ceramic handle.

Due to the material difference and thermal expansion coefficient difference between the filling glue and the probe body, during the use of the product, the external water vapor can easily enter through the gap between the glue and the probe body due to the thermal shock, thus corroding the internal components of the probe and making the product unusable.

The service life of the product is very short due to the influence of the temperature resistance, moisture resistance, and thermal aging properties of the sealing glue material.

Therefore, it is an urgent technical problem to be solved by those skilled in the art to find an adaptive waterproof food temperature probe.

BRIEF DESCRIPTION OF THE DRAWINGS

In order to more clearly illustrate the technical solutions in this embodiment disclosure, the drawings used in the embodiments or the description of the prior art will be briefly introduced below. It should be understood that, the drawings in the following description are only examples of the present disclosure. For those skilled in the art, other drawings can be obtained based on these drawings without creative works.

Figure 1:
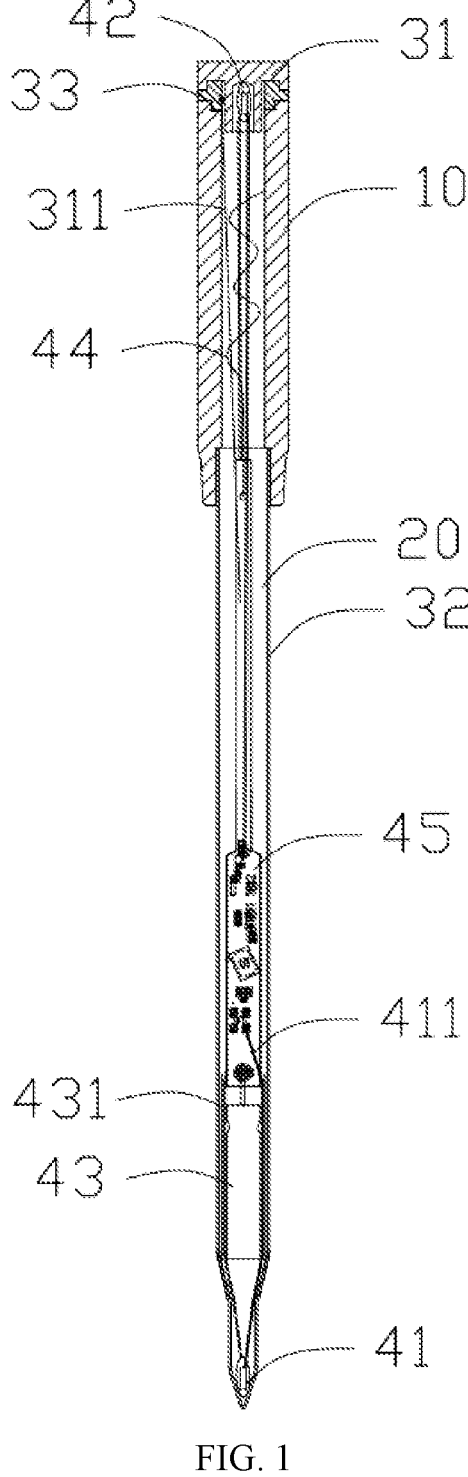
FIG. 1 is a first schematic view of a food temperature probe in Embodiment 1.
Figure 2:
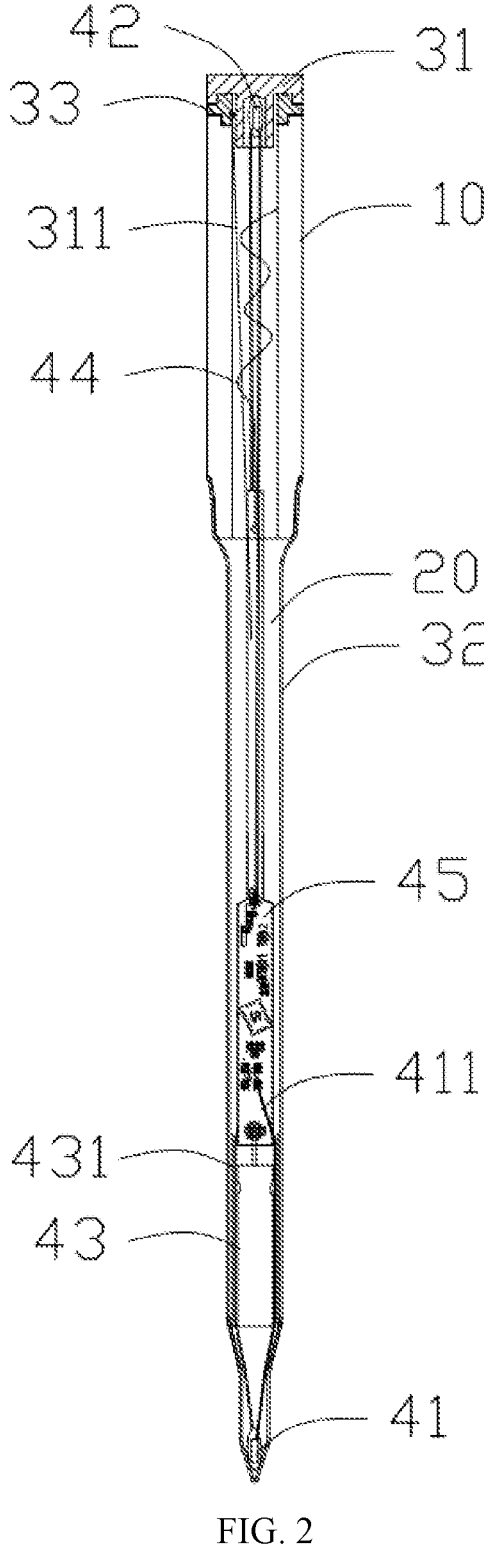
FIG. 2 is a second schematic view of the food temperature probe in Embodiment 1.

Reference numerals are as follows: 10, handle body; 20, probe body; 31, first pole; 311, first pole extension wire; 32, second pole; 33, transfer piece; 34, first insulating ceramic; 35, second insulating ceramic; 36, third insulating ceramic; 41, first temperature sensing element; 411, first temperature sensing element lead; 42, second temperature sensing element; 43, power supply module; 431, heat insulation film; 44, antenna; 45, circuit board; 51, glass frit; 52, enamel glaze; 53, ceramic metallization layer; 54, brazing material; and 55, ceramic metallization brazing material.

DETAILED DESCRIPTION

In order to facilitate the understanding of the present application, the present application will be described more comprehensively with reference to the relevant drawings. Preferred embodiments of the present application are shown in the drawings. However, the present application can be implemented in many different forms and is not limited to the embodiments described herein. On the contrary, the purpose of providing these embodiments is to make the disclosure of the present application more thorough and comprehensive.

It should be noted that when an element is referred to as being "fixed to" another element, it can be directly on another element or an intermediate element may also be present. When an element is considered to be "connected to"

another element, it can be directly connected to another element or an intermediate element may be present at the same time.

Terms "length," "width," "upper," "lower," "front," "rear," "left," "right," "vertical," "horizontal," "perpendicular," "top," "bottom," "inner," "outer," and other directional or positional relationships are based on the orientation or positional relationships shown in the accompanying drawings. They are used for the purpose of facilitating the description and simplifying the explanation in this application, and should not be interpreted as indicating or implying that the device or component referred to must have specific orientations, be constructed or operated in specific orientations. Therefore, they should not be understood as limiting the scope of this application.

Furthermore, the terms "first" and "second" are used for descriptive purposes only and should not be interpreted as indicating or implying relative importance or the quantity of technical features being referred to. Thus, features designated as "first" or "second" may include one or more of those features, either explicitly or implicitly. In the description of this application, the terms "multiple" and "several" mean two or more, unless otherwise specifically stated.

It should be noted that the structures, proportions, sizes, etc., depicted in the drawings of this specification are intended to complement the disclosed content and facilitate the understanding and reading of those skilled in the art, and are not intended to limit the conditions under which this application can be implemented. Therefore, any modifications to the structure, changes in proportion, or adjustments in size that do not affect the efficacy or objectives of this application are still within the scope of the disclosed technical content of this application.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. As used herein, the term "and/or" includes any and all combinations of one or more of the associated listed items.

Embodiments of the present disclosure provide a food temperature probe to address the issue of unstable connection between the probe body and the handle body in conventional technology, which can lead to water vapor entering the interior of the food temperature probe and easily damaging the probe.

In a first implementation, referring to FIGS. 1 to 14, the present application provides a food temperature probe comprising: a handle body 10, a probe body 20, a first pole 31, a first temperature sensing element 41, a power supply module 43, an antenna 44, and a circuit board 45. A second pole 32 is disposed on the probe body 20.

The interior of the handle body 10 and the interior of the probe body 20 are communicated to form an accommodating cavity, and the handle body 10 and the probe body 20 are connected by brazing.

The circuit board 45 is disposed in the accommodating cavity, and the first temperature sensing element 41 is disposed in the accommodating cavity at an end thereof away from the handle body 10.

The first pole 31, the first temperature sensing element 41, the power supply module 43, and the antenna 44 are electrically connected to the circuit board 45.

It should be noted that the handle body 10 may be made of a ceramic material or a metal material. The probe body 20 is made of metal material. The first temperature sensing element is configured to measure the temperature of the food, and illustratively, when the front end of the probe body 20 is placed into the food, the first temperature sensing element 41 disposed in the accommodating cavity measures the temperature of the food. The antenna 44 is disposed in the accommodating cavity at a position corresponding to the handle body 10.

Specifically, the first temperature sensing element 41 is connected to the circuit board 45 by a first temperature sensing element lead 411.

It is worth noting that brazing refers to a welding method in which a brazing material with a melting point lower than a melting point of a weldment and the weldment are simultaneously heated to the melting temperature of the brazing material, and then the liquid brazing material is used for filling gaps of the solid workpiece to achieve metal connection. During brazing, an oxide film and oil stains on a contact surface of a base material are removed firstly, so that the capillary action can play a role after the brazing material is melted, and the wettability and capillary fluidity of the brazing material are increased. Depending on the melting point of the brazing material, brazing is further classified into hard brazing and soft brazing.

In the food temperature probe provided by the embodiment, the handle body 10, the probe body 20, the first pole 31, the first temperature sensing element 41, the power supply module 43, the antenna 44, and the circuit board 45 are provided. The second pole 32 is disposed on the probe body 20. The interior of the handle body 10 and the interior of the probe body 20 are communicated to form an accommodating cavity. The handle body 10 and the probe body 20 are connected by brazing. The circuit board 45 is disposed in the accommodating cavity, and the first temperature sensing element 41 is disposed in the accommodating cavity at an end thereof away from the handle body 10. The first pole 31, the first temperature sensing element 41, the power supply module 43, and the antenna 44 are electrically connected to the circuit board 45. The handle body and the probe body are integrally brazed, ensuring a stable structure, better moisture resistance and water resistance, and convenient positioning to maintain coaxially arrangement of the handle body and the probe body. The food temperature probe provided by this application has the advantages that water vapor is not easy to enter the food temperature probe when the temperature is measured, with a more stable structure and longer service life. The handle body 10 and the probe body 20 are connected by brazing, which is water and moisture proof. When food temperature is measured, water vapor will not enter the inside of the food temperature probe, ensuring water and moisture proof, and longer service life of the food temperature probe.

In a second implementation, referring to FIGS. 1 to 14, a transfer piece 33 is further included.

The first pole 31 is connected to the handle body 10 via the transfer piece 33.

Or, the second pole 32 is connected to the first pole 31 via the transfer piece 33.

In the third implementation, referring to FIGS. 1 to 14, an outer diameter of an end of the probe body 20 facing the handle body 10 is smaller than an inner diameter of an end of the handle body 10 facing the probe body 20, so that the probe body 20 can be inserted into the handle body 10 and is brazed to the handle body 10.

Or, an outer diameter of an end of the handle body 10 facing the probe body 20 is smaller than an inner diameter of an end of the probe body 20 facing the handle body 10, so that the handle body 10 can be inserted into the probe body 20 and is brazed to the probe body 20.

It should be noted that brazing after partially inserting the probe body 20 into the handle body 10 or brazing after partially inserting the handle body 10 into the probe body 20 results in a more stable structure.

In the fourth implementation, referring to FIGS. 1 to 14, the transfer piece 33 is disposed at an end of the handle body 10 away from the probe body 20, and the first pole 31 is disposed at an end of the transfer piece 33 away from the handle body 10.

The transfer piece 33 is brazed to the handle body 10.

The first pole 31 is connected to the transfer piece 33 by one or more of laser welding, fusion welding, cold welding, threading with glue, and threading with a sealing ring.

The first pole 31 is electrically connected to the circuit board 45 through a first pole extension wire 311.

It should be noted that the first pole 31 and the transfer piece 33 are welded and then disposed at the tail end of the handle body 10 to seal the accommodating cavity. The first pole 31 has a shape adapted to the shape of the transfer piece 33.

In the fifth implementation, referring to FIGS. 1 to 14, the first pole 31 and the transfer piece 33 are connected into a whole by one or more of laser welding, fusion welding, cold welding, threading with glue, and threading with a sealing ring, and disposed at the middle of the handle body 10.

The first pole 31 is electrically connected to the circuit board 45 through a first pole extension wire 311.

In the sixth implementation, referring to FIGS. 1 to 14, a first insulating ceramic 34 is further included. The probe body 20 is sequentially connected to the transfer piece 33, the first insulating ceramic 34, and the first pole 31 at an end of the probe body 20 away from the handle body 10. The transfer piece 33 is connected to the probe body 20 through one or more of laser welding, fusion welding, cold welding, threading with glue, and threading with a sealing ring. The transfer piece 33 is brazed to the first insulating ceramic 34, and the first insulating ceramic 34 is brazed to the first pole.

The first pole 31 is electrically connected to the circuit board 45 through a first pole extension wire 311.

It should be noted that the first pole extension wire 311 is connected to the transfer piece 33, so that the first pole 31 is electrically connected to the circuit board 45.

In the seventh implementation, referring to FIGS. 1 to 14, the handle body 10 and the probe body 20 are brazed using a glass frit 51 as a filler material.

Certainly, the first pole 31 and the transfer piece 33 can also be brazed using a glass frit 51 as a filler material.

In the eighth implementation, referring to FIGS. 1 to 14, the handle body 10 and the probe body 20 are brazed using a ceramic metallization brazing material 55 as a filler material.

Certainly, the first pole 31 and the transfer piece 33 can also be brazed using a ceramic metallization brazing material 55 as a filler material.

In the ninth implementation, referring to FIGS. 1 to 14, a second temperature sensing element 42 is further included. The second temperature sensing element 42 is disposed in the accommodating cavity at an end thereof away from the probe body 20.

It should be noted that the second temperature sensing element 42 is disposed in the accommodating cavity at a position corresponding to the handle body 10. The second temperature sensing element 42 is used to measure the temperature of the food cooker. The temperature of the food is measured by arranging the first temperature sensing element 41 and the temperature of the food cooker is measured by arranging the second temperature sensing element 42, so that the temperature of the food can be better monitored to ensure the suitable taste, and the user experience is improved.

In the tenth implementation, referring to FIGS. 1 to 14, the end of the probe body 20 away from the handle body 10 gradually tapers towards the direction away from the handle body 10, forming a pointed tip.

It should be noted that the front end of the probe body 20 adopts a variable diameter design, which facilitates inserting the food temperature probe into the interior of the food. In addition, due to the small size achievable with the variable diameter design, it enables the first temperature sensing element 41 to measure the temperature more easily.

In the eleventh implementation, referring to FIGS. 1 to 14, a heat insulation film 431 is disposed on the power supply module 43.

It should be noted that when the probe body 20 is inserted into a food, the power supply module is damaged easily due to an excessively high temperature of the food, and thus the heat insulating film 431 is provided on the power supply module 43.

Below, more specific implementations will be described.

Embodiment 1

Combining the first, second, third, fourth, ninth, tenth, and eleventh implementations, and referring to FIG. 1, the food temperature probe provided in this embodiment includes a handle body 10, a probe body 20, a first pole 31, a first temperature sensing element 41, a second temperature sensing element 42, a power supply module 43, a heat insulation film 431, an antenna 44, and a circuit board 45. A second pole 32 is disposed on the probe body 20. The probe body 20 is inserted in the handle body 10 and then brazed to the handle body 10.

The assembly of the food temperature probe is as follows.

Before brazing, it is first necessary to perform surface cleaning to the handle body 10, probe body 20, and other parts that require brazing. The metal parts and brazing materials should be degreased first, followed by pickling or alkali cleaning to remove the oxide film. Then, they should be rinsed with running water and dried. The cleaned parts should be immediately moved to the next step or placed in a dryer to prevent re-contamination and re-oxidation. Ceramic parts (handle body 10) should be cleaned using acetone with ultrasonic cleaning, followed by rinsing with running water, and finally boiling twice in deionized water for 15 minutes each time.

After the surface cleaning, paste coating is carried out. Paste is generally prepared from pure metal powder with a particle size of 1 μm to 5 μm and organic binder. The most used pure metal powder is molybdenum powder, followed by tungsten powder. In addition, in order to improve the combination of refractory metal powder and ceramic, some manganese, iron, and titanium powder are added. Organic binder is nitrocellulose, amyl acetate, and acetone. When coating, the paste is coated on the surface of the ceramic that needs metallization by a brush pen or a paste coating machine. The coating has a thickness of generally 0.3 mm to 0.6 mm.

After the paste coating, the ceramic part (handle body 10) is placed in a hydrogen furnace and sintered at a temperature of 1300° C. to 1500° C. using wet hydrogen or cracked ammonia for 30 min to 60 min to metallize the ceramic. For the Mo—Mn metallization layer, in order to make it wet with the brazing material, an additional layer of 4 μm to 5 μm nickel needs to be plated. If the brazing temperature is below 1000° C., the nickel layer also needs to be pre-sintered in a hydrogen furnace at a temperature of 1000° C. for 15 min to 20 min. Then, brazing is performed using the brazing material, and a certain pressure (approximately 0.49 MPa to 0.98 MPa) should be applied during brazing. Braz- ing is carried out in hydrogen, under hydrogen protection, or in a vacuum.

Due to the components disposed in the accommodating cavity being unable to withstand too high temperatures, such as the first temperature sensing element 41, the power supply module 43 and the like, during the assembly of the food temperature probe, the handle body 10 and the probe body 20 are first brazed together, followed by brazing the transfer piece 33 to the handle body 10, resulting in an integrated handle body 10, probe body 20, and transfer piece 33. Then, components such as the first temperature sensing element 41, power supply module 43, second temperature sensing element 42, antenna 44, and first pole extension wire 311 are welded to their corresponding positions on the circuit board 45. During welding, the power supply module 43 is wrapped with a heat insulation film 431, and other components on the circuit board 45 are insulated. After the components con- nected to the circuit board 45 are connected, an appropriate amount of thermally conductive silicone grease is injected into the integrated handle body 10, probe body 20, and transfer piece 33. Specifically, the thermally conductive silicone grease is injected into the bottom of an end of the accommodating cavity, namely, near the tip position of the first temperature sensing element 41. The circuit board 45 with the components welded is placed into the accommo- dating cavity and pushed to the bottom. A special fixture is used to ensure that the circuit board 45 is placed radially in the middle of the interior of the probe body 20. Thermal insulation powder is then placed in the probe body 20, compacted by vibration, and filled with waterproof and moisture-proof glue. The first pole extension wire 311 is then connected to the transfer piece 33. Finally, the first pole 31 is mounted to seal the accommodating cavity. It should be noted that a chamber is provided on a side of the first pole 31 facing the accommodating cavity, which is compatible with the second temperature sensing element 42. Since other components such as the power supply module 43 and circuit board 45 are mounted in the accommodating cavity, if the first pole 31 and the transfer piece 33 are finally packaged by brazing, the temperature would be too high. Alternatively, the first pole 31 and the transfer piece 33 can be connected using methods such as laser welding, fusion welding, cold welding, threading with glue, or threading with a sealing ring. After packaging, the second temperature sensing ele- ment 42 is in close contact with the chamber.

In the food temperature probe provided in this embodi- ment, the handle body 10 and the probe body 20 are integrally brazed, ensuring a stable structure, better moisture resistance and water resistance, and convenient positioning to maintain coaxially arrangement of the handle body 10 and the probe body 20. The provided second temperature sensing element 42 can measure the temperature of the food cooker. The front end of the probe body 20 adopts the variable diameter design, which facilitates inserting the probe body 20 into the interior of the food, improving the speed and accuracy of temperature measurement. Additionally, one or more of laser welding, fusion welding, or cold welding are added between the first pole 31 and the transfer piece 33 to be connected, and the first pole 31 and the transfer piece 33 are fused into a whole. Or, the first pole 31 and the transfer piece 33 are connected through threading with glue or threading with a sealing ring, so that the integrity of the whole food temperature probe is ensured, and the moisture- proof and waterproof performance of the food temperature probe is further improved.

It is worth noting that, referring to FIG. 1, after the handle body 10 is wrapped around the probe body 20, the handle body 10 and the probe body 20 are connected by brazing. In another implementation of this embodiment, referring to FIG. 2, after the probe body 20 is wrapped around the handle body 10, the probe body 20 and the handle body 10 are connected by brazing.

Embodiment 2

Figure 3:
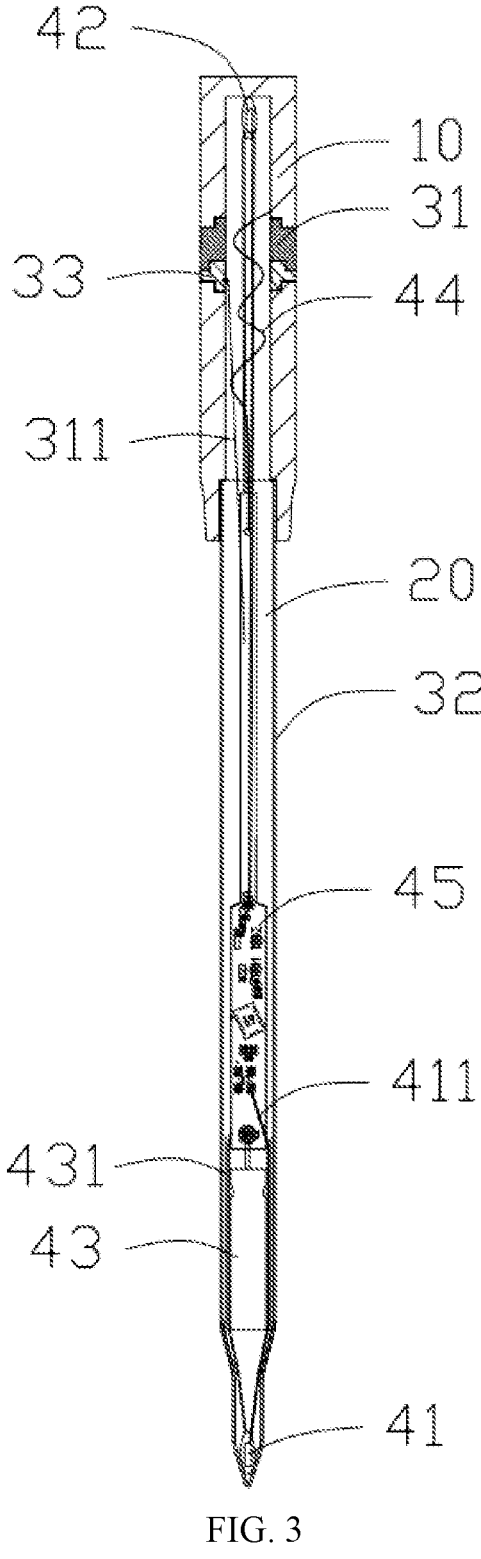
FIG. 3 is a first schematic view of a food temperature probe in Embodiment 2.
Figure 4:
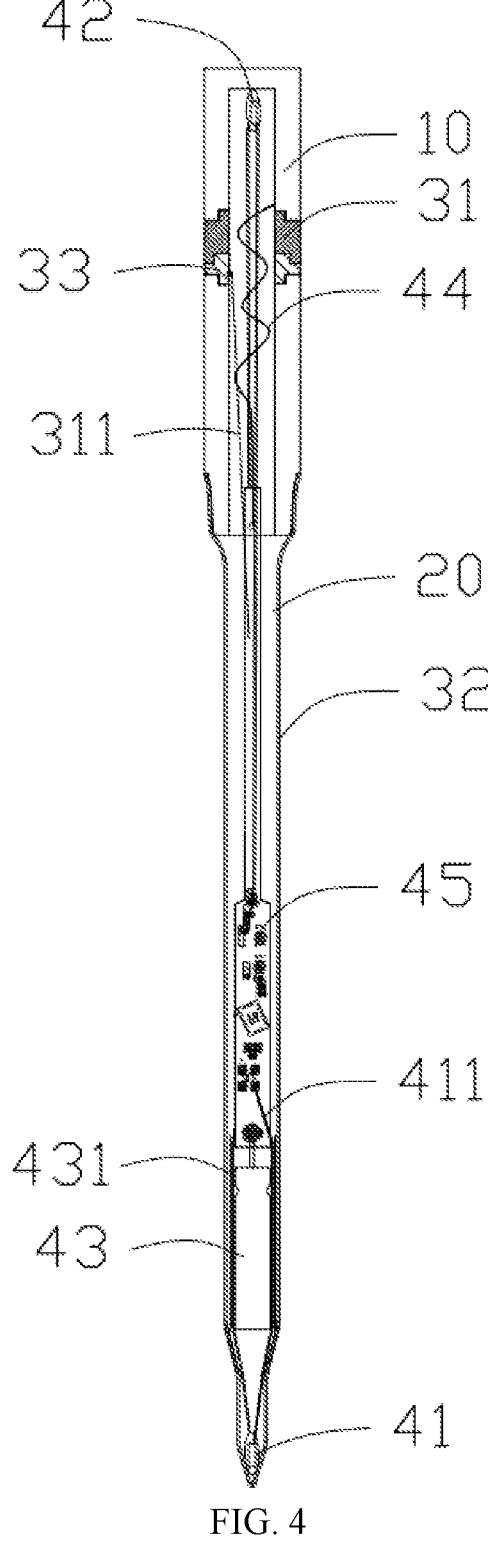
FIG. 4 is a second schematic view of the food temperature probe in Embodiment 2.

Combining the first, second, third, fifth, ninth, tenth, and eleventh implementations, and referring to FIG. 3, the difference from Embodiment 1 is that the first pole 31 and the transfer piece 33 are disposed in the middle of handle body 10. During brazing and packaging, the transfer piece is firmly connected and sealed with one section of the handle body 10 and the probe body 20 through brazing to obtain a first integrated piece. In addition, the first pole 31 is firmly connected and sealed with the other section of the handle body 10 through brazing to obtain a second integrated piece. Then, the first integrated piece and the second integrated piece are connected in one or more of laser welding, fusion welding, and cold welding, namely the first pole 31 and the transfer piece 33 are connected in one or more of laser welding, fusion welding, and cold welding.

It is worth noting that, referring to FIG. 3, after the handle body 10 is wrapped around the probe body 20, the handle body 10 and the probe body 20 are connected by brazing. In another implementation of this embodiment, referring to FIG. 4, after the probe body 20 is wrapped around the handle body 10, the probe body 20 and the handle body 10 are connected by brazing.

Embodiment 3

Figure 5:
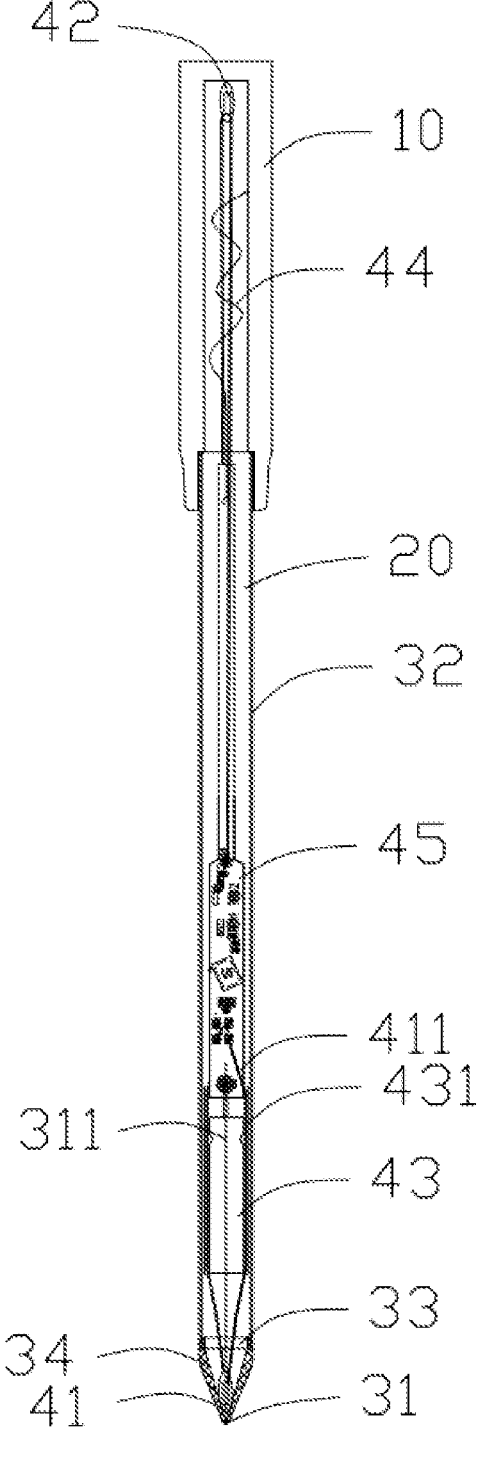
FIG. 5 is a first schematic view of a food temperature probe in Embodiment 3.
Figure 6:
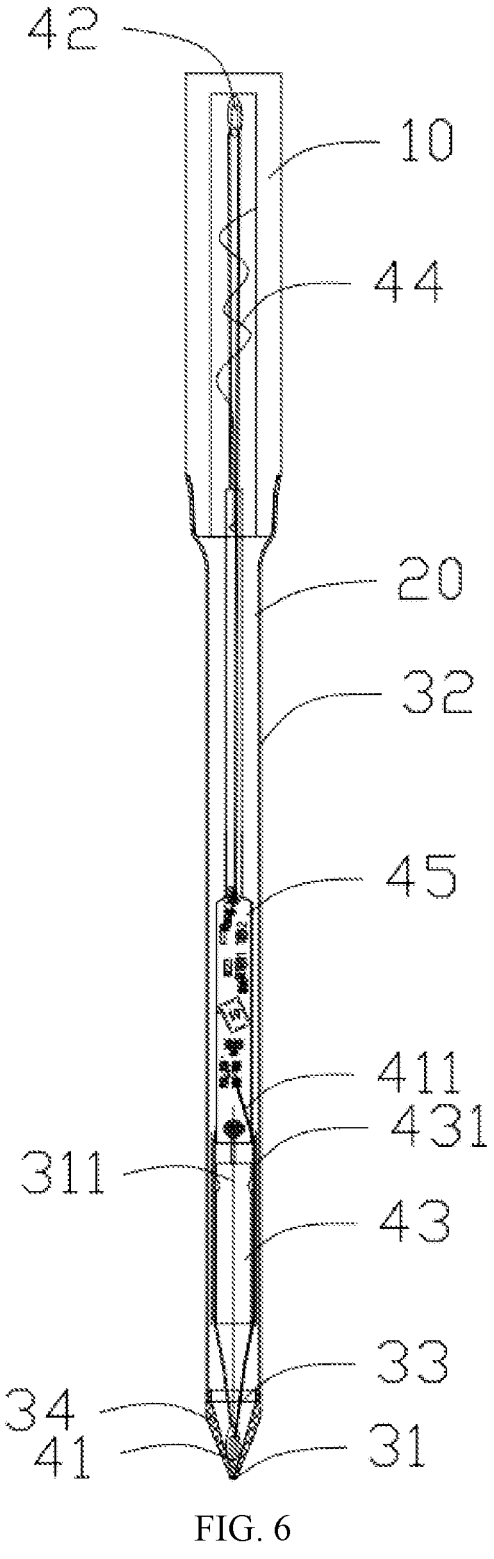
FIG. 6 is a second schematic view of the food temperature probe in Embodiment 3.

Combining the first, second, third, sixth, ninth, tenth, and eleventh implementations, and referring to FIG. 5, the difference from Embodiment 1 is that the first pole 31, the first insulating ceramic 34, and the transfer piece 33 are disposed at the front end of the probe body 20. Since the probe body 20 is made of metal, the first insulating ceramic 34 is provided between the first pole 31 and the transfer piece 33. The corresponding first pole extension wire 311 is also electrically connected to the circuit board 45 from the corresponding position inside the probe body 20.

During assembly, after brazing the handle body 10 and the probe body 20 together, the transfer piece 33, first insulating ceramic 34, and first pole 31 are brazed sequentially. Then, the components disposed inside the accommodating cavity are assembled and placed into the accommodating cavity. Finally, the welded integrated transfer piece 33, the first insulating ceramic 34, and first pole 31 are connected to the integrated handle body 10 and probe body 20.

It is worth noting that, referring to FIG. 5, after the handle body 10 is wrapped around the probe body 20, the handle body 10 and the probe body 20 are connected by brazing. In another implementation of this embodiment, referring to FIG. 6, after the probe body 20 is wrapped around the handle body 10, the probe body 20 and the handle body 10 are connected by brazing.

Embodiment 4

Figure 7:
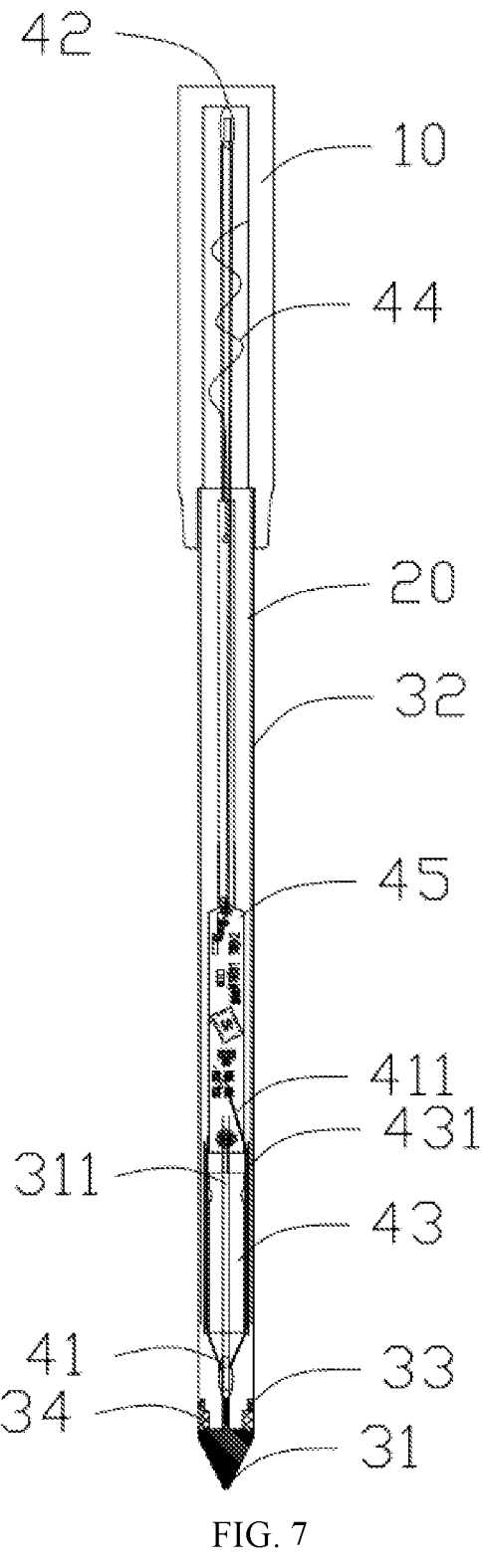
FIG. 7 is a first schematic view of a food temperature probe in Embodiment 4.
Figure 8:
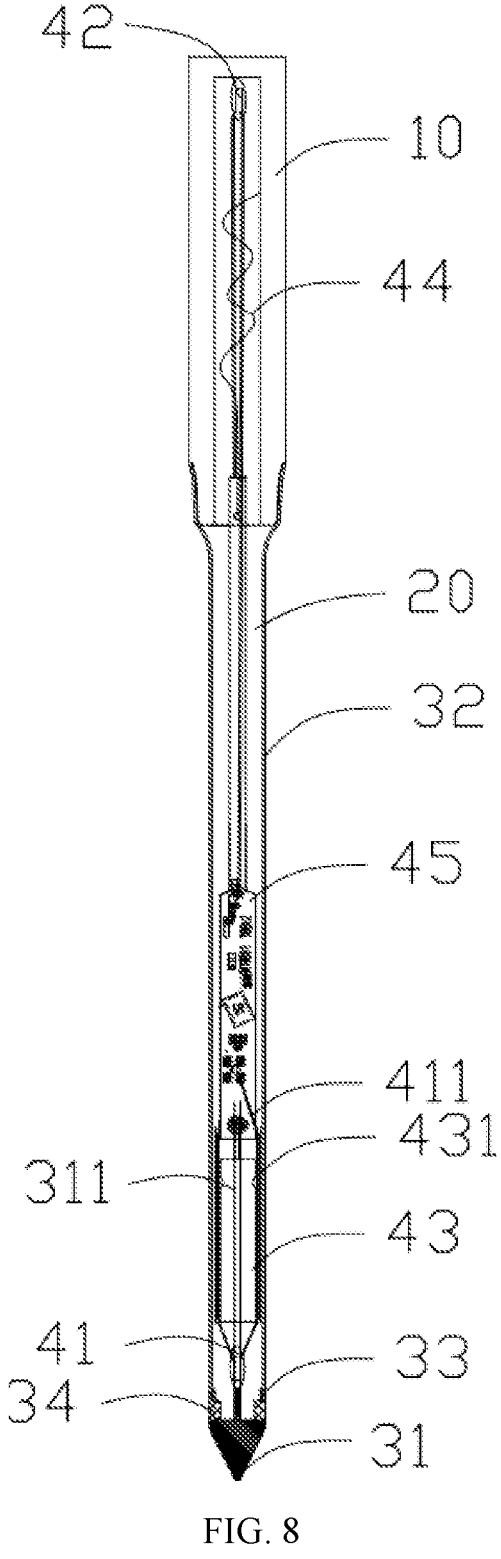
FIG. 8 is a second schematic view of the food temperature probe in Embodiment 4.

Combining the first, second, third, sixth, ninth, and eleventh implementations, and referring to FIG. 7, the difference from the aforementioned Embodiment 3 is that, the first pole 31 is designed as an integrated rivet post, facilitating easy insertion into food. The other end of the first pole 31 extends towards the probe body 20 with a post inserted into the first insulating ceramic 34 and the transfer piece 33. The contact surface between the transfer piece 33 and the probe body 20 is connected through one or more methods of laser welding, fusion welding, or cold welding, resulting in a more stable structure.

It is worth noting that, referring to FIG. 7, after the handle body 10 is wrapped around the probe body 20, the handle body 10 and the probe body 20 are connected by brazing. In another implementation of this embodiment, referring to FIG. 8, after the probe body 20 is wrapped around the handle body 10, the probe body 20 and the handle body 10 are connected by brazing.

Embodiment 5

Figure 9:
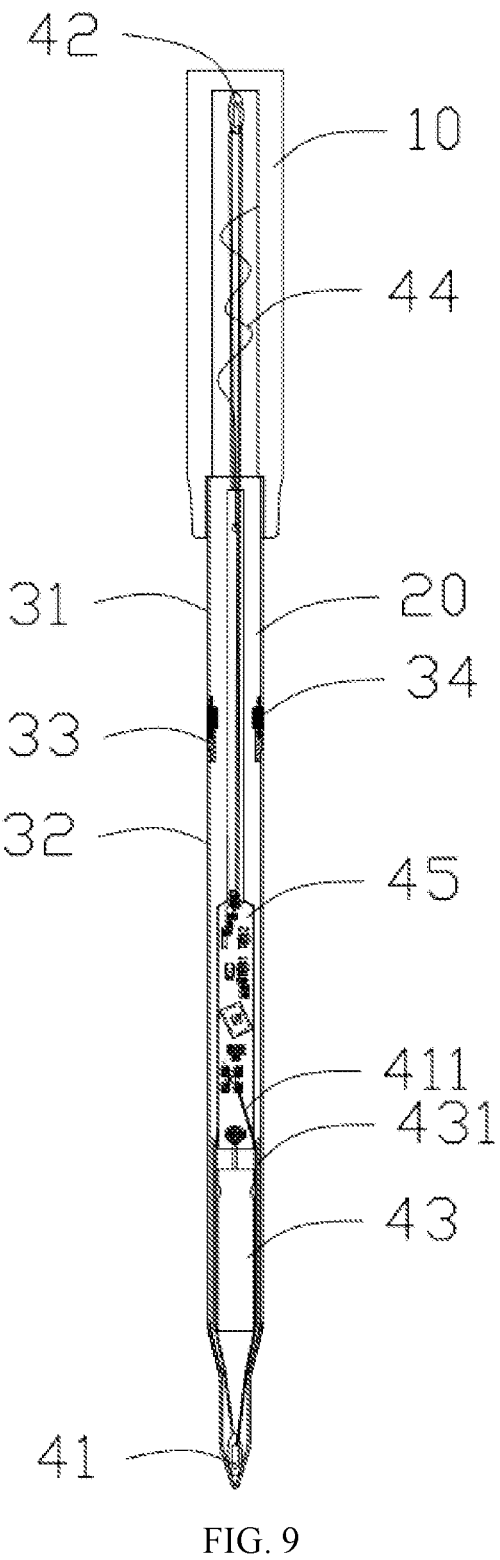
FIG. 9 is a first schematic view of a food temperature probe in Embodiment 5.

Combining the first, second, third, ninth, tenth, and eleventh implementations, and referring to FIG. 9, the first pole 31 is also disposed on the probe body 20, and the first insulating ceramic 34 and the transfer piece 33 are also disposed on the probe body 20.

It is worth noting that, referring to FIG. 9, after the handle body 10 is wrapped around the probe body 20, the handle body 10 and the probe body 20 are connected by brazing. In another implementation of this embodiment, referring to FIG. 10, after the probe body 20 is wrapped around the handle body 10, the probe body 20 and the handle body 10 are connected by brazing.

Figure 10:
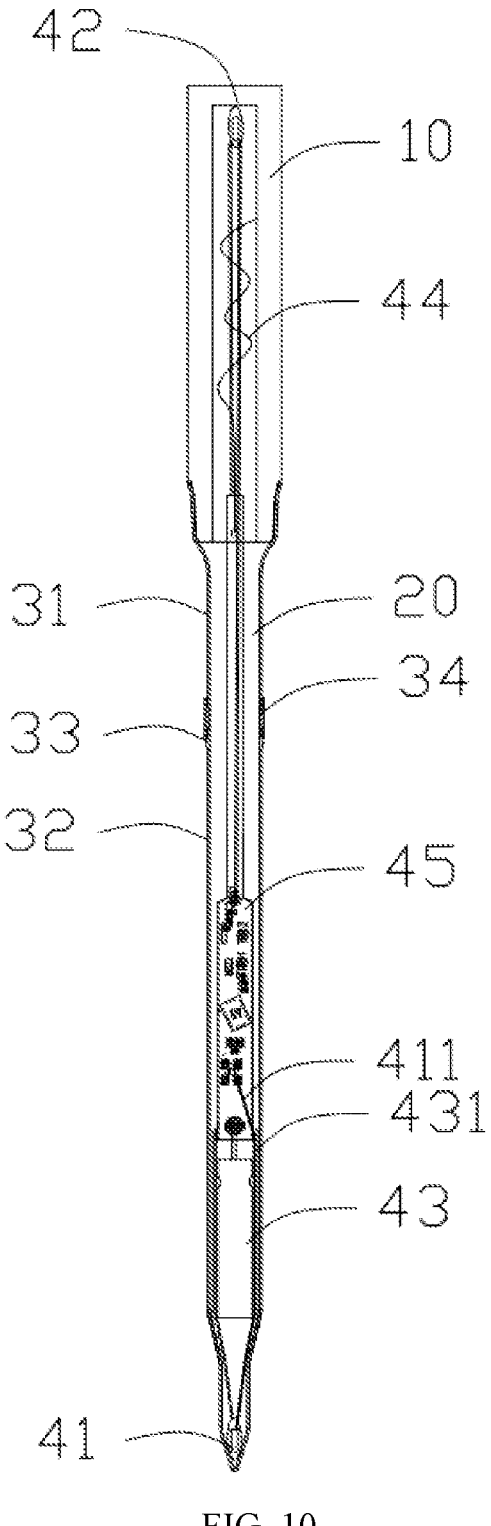
FIG. 10 is a second schematic view of the food temperature probe in Embodiment 5.

It should be noted that when the transfer piece 33 is in direct contact with the first pole 31, the transfer piece 33 serves as a first pole transfer piece. When the transfer piece 33 is in direct contact with the second pole 32, the transfer piece 33 serves as a second pole transfer piece. In Embodiment 5, the transfer piece 33 as shown in FIGS. 9 and 10 is the second pole transfer piece.

Embodiment 6

Figure 11:
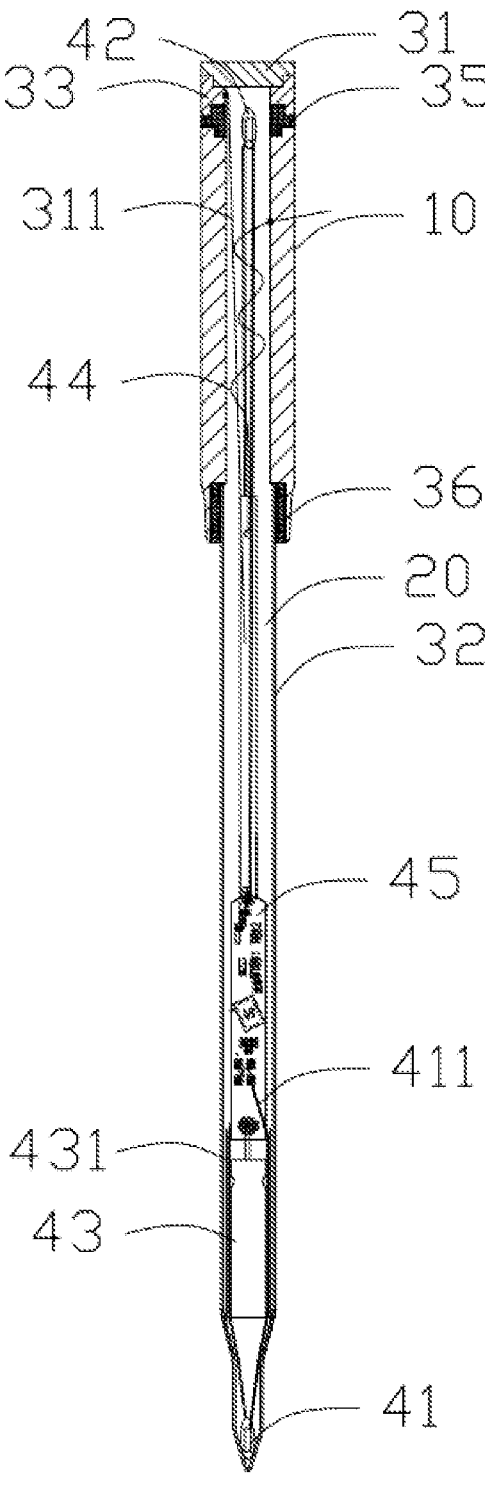
FIG. 11 is a schematic view of a food temperature probe in Embodiment 6.

Referring to FIG. 11, this embodiment provides an implementation where the handle body 10 is made of metal and the antenna 44 is externally mounted, that is, the antenna 44 is externally mounted after the circuit board 45, the antenna 44, and the handle body 10 are conducted. Since the handle body 10 is made of metal, a second insulating ceramic 35 is provided between the transfer piece 33 and the handle body 10. Additionally, a third insulating ceramic 36 is provided at the connection between the handle body 10 and the probe body 20. The third insulating ceramic 36 is brazed to the probe body 50. The third insulating ceramic 36 is brazed to the handle body 10.

Embodiment 7

Figure 12:
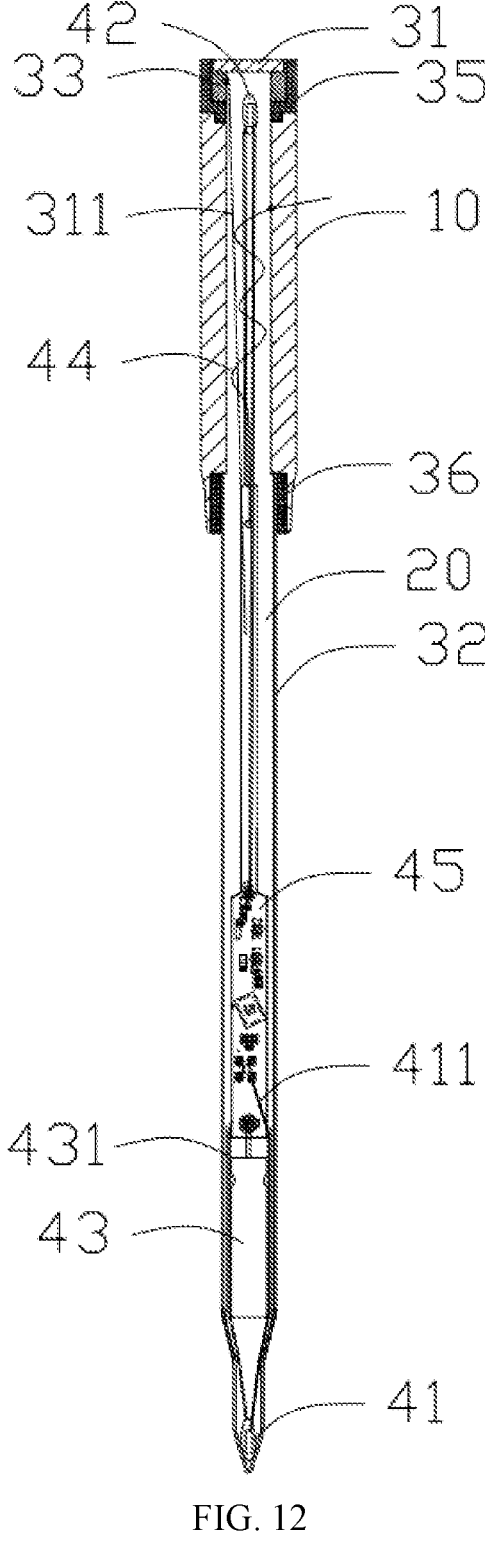
FIG. 12 is a schematic view of a food temperature probe in Embodiment 7.

Referring to FIG. 12, the difference between Embodiment 7 and Embodiment 6 lies in the different arrangements of the third insulating ceramic 36, the transfer piece 33, and the first pole 31.

Embodiment 8

Figure 13:
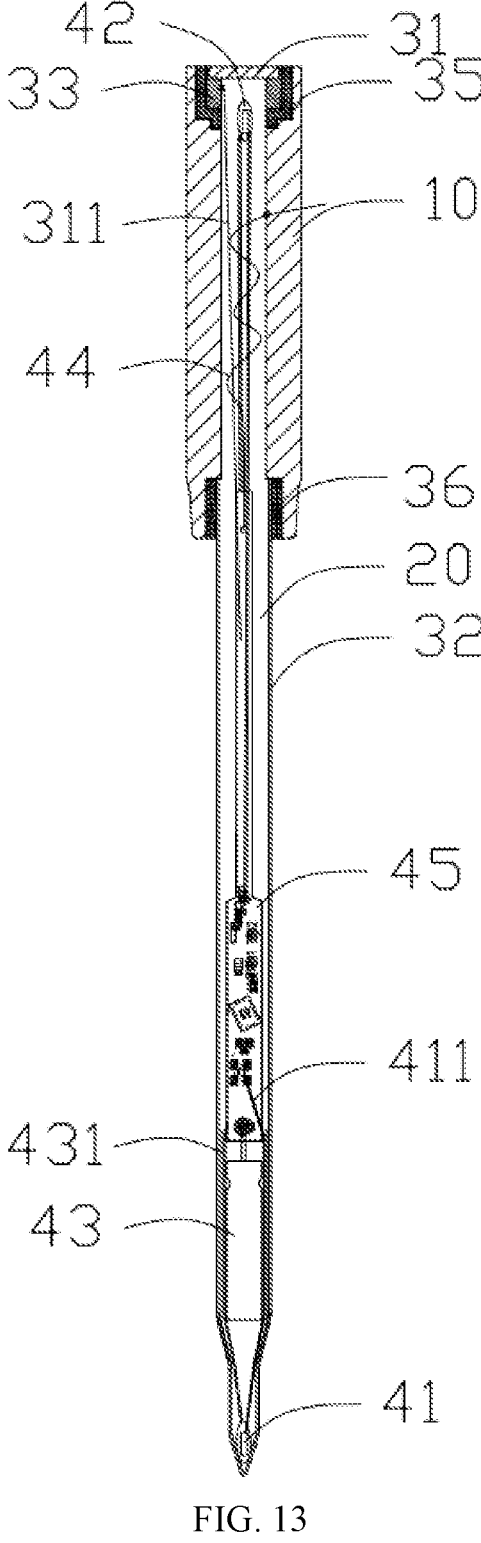
FIG. 13 is a schematic view of a food temperature probe in Embodiment 8.
Figure 14:
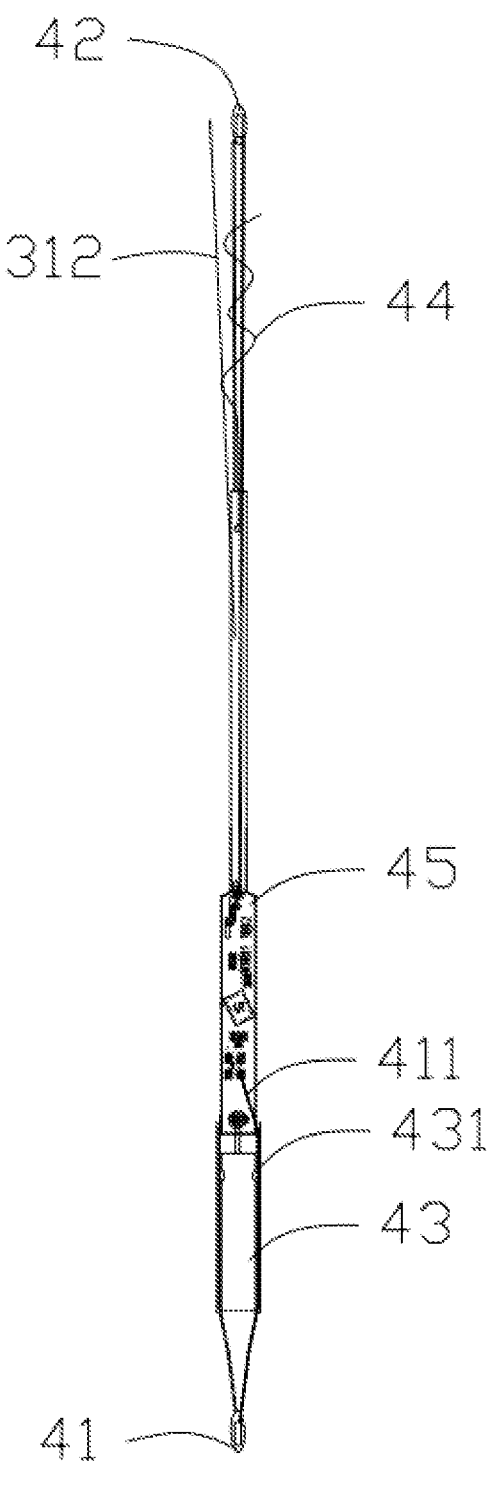
FIG. 14 is a schematic view of a circuit board assembly component.

Referring to FIG. 13, the difference between Embodiment 8 and Embodiment 6 lies in the different arrangements of the third insulating ceramic 35, the transfer piece 33, and the first pole 31.

Embodiment 9

The aforementioned Embodiments 1 to 8 have provided specific implementations where the transfer piece 33 is made of metal. This Embodiment 9 will provide a specific implementation where the transfer piece 33 is made of ceramic material.

Figure 21:
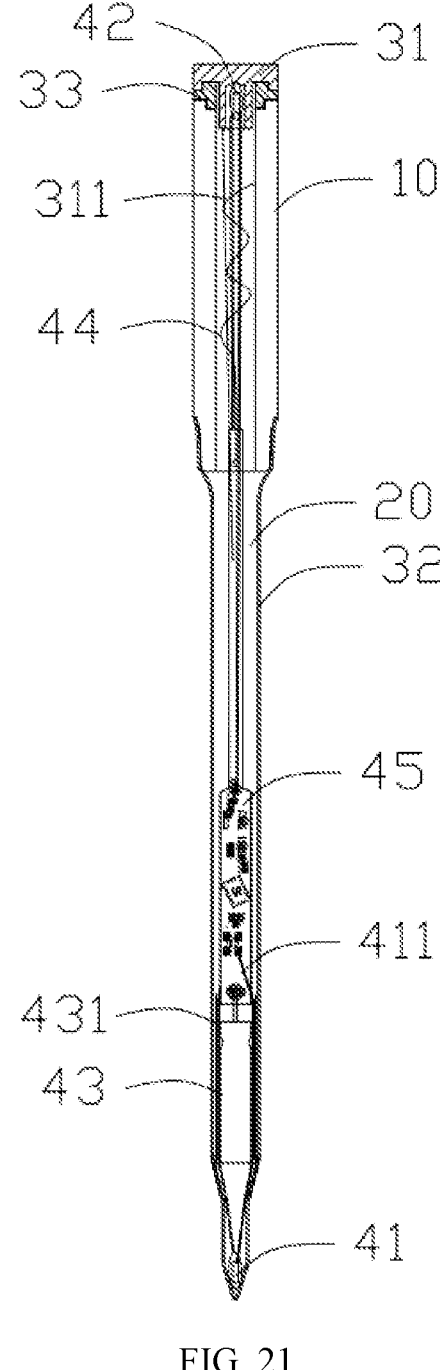
FIG. 21 is a schematic view of a food temperature probe in Embodiment 9.

Referring to FIG. 21, in this Embodiment, the transfer piece 33 is made of ceramic material. The first pole extension wire 311 is directly connected to the first pole 31. During packaging, the transfer piece 33 is connected to the handle body 10 through threading with glue or threading with a sealing ring.

It is worth noting that, according to Embodiment 1 and Embodiment 9, if the transfer piece 33 is made of metal, the first pole extension wire 311 can be connected to the transfer piece 33, and the first pole extension wire 311 can also be connected to the first pole 31. If the transfer piece 33 is made of ceramic material, the first pole extension wire 311 is connected to the first pole 31.

Repeated portions in various embodiments will not be further repeated.

The aforementioned eight embodiments provide eight specific assembly methods. Of course, food temperature probes obtained through combinations of different implementations based on the inventive concept of this application still fall within the scope of protection of this application. It is worth noting that when brazing is performed, there can be variations in the brazing method, which will be specifically described below.

Figure 15:
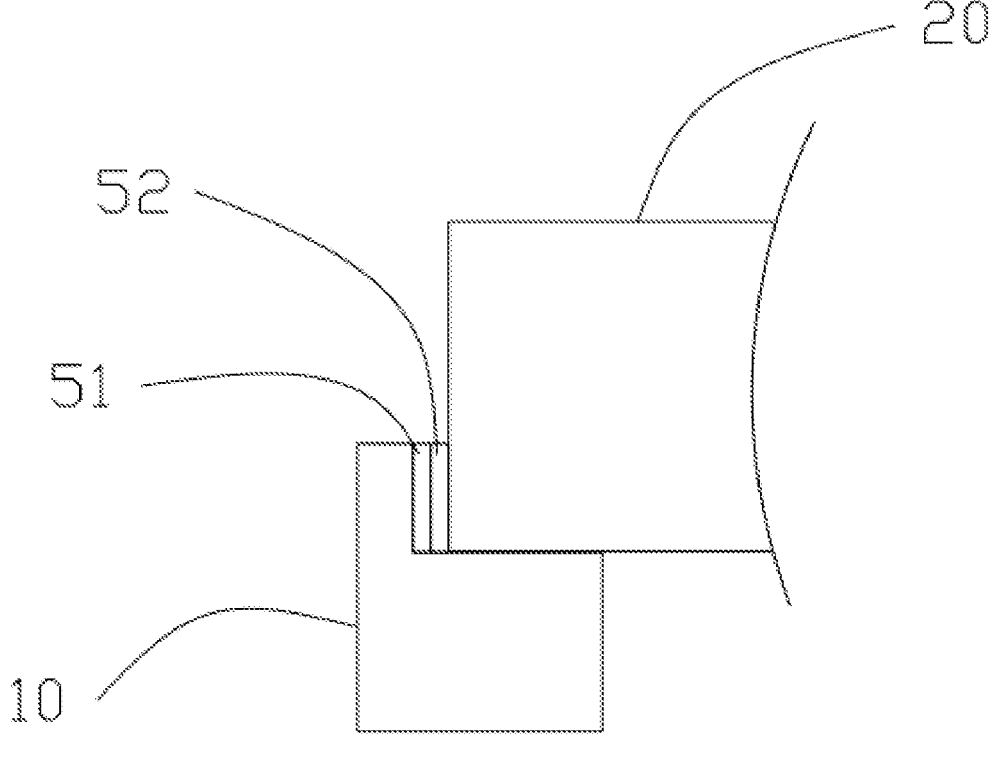
FIG. 15 is a schematic view of a first brazing method.

Referring to FIG. 15, enamel glaze 52 is placed between the contact surface of the handle body 10 and the probe body 20. After assembling the handle body 10 and the probe body 20, glass frit 51 is filled into the gap between the handle body 10 and the probe body 20. Then, sintering is performed after brazing. (The order of assembly and filling with glass frit 51 can be reversed.)

Figure 16:
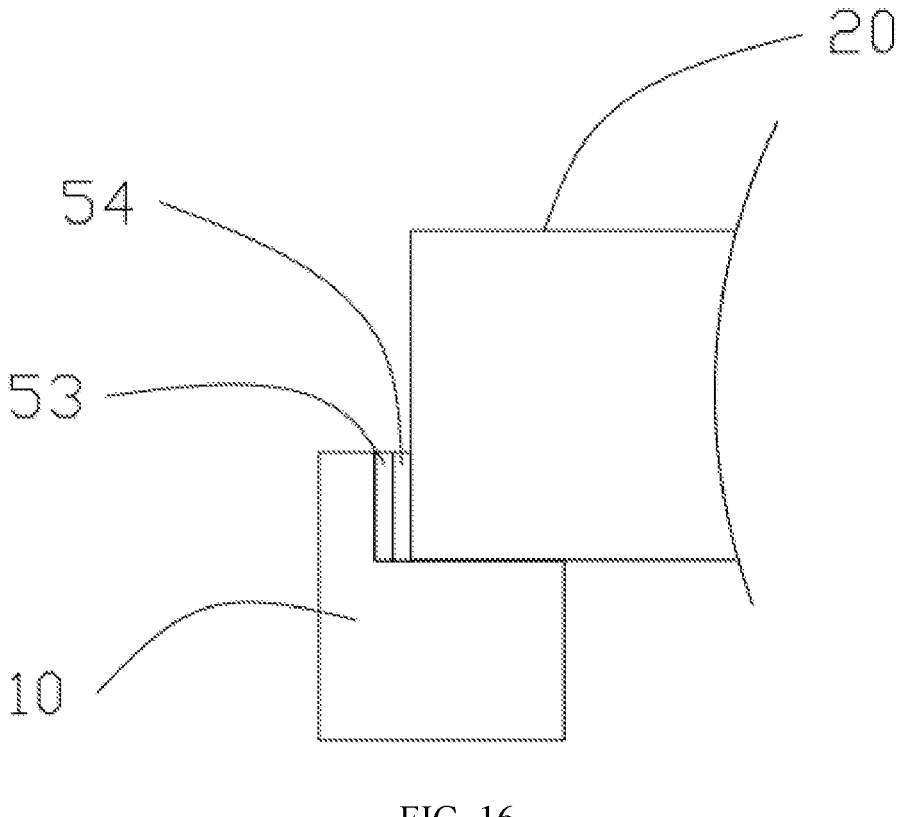
FIG. 16 is a schematic view of a second brazing method.

Referring to FIG. 16, a ceramic metallization layer 53 is coated between the contact surface of the handle body 10 and the probe body 20. After assembling the handle body 10 and the probe body 20, brazing material 54 is filled into the gap between the handle body 10 and the probe body 20. Then, sintering is performed after brazing. (The order of assembly and filling with brazing material can be reversed.)

Figure 17:
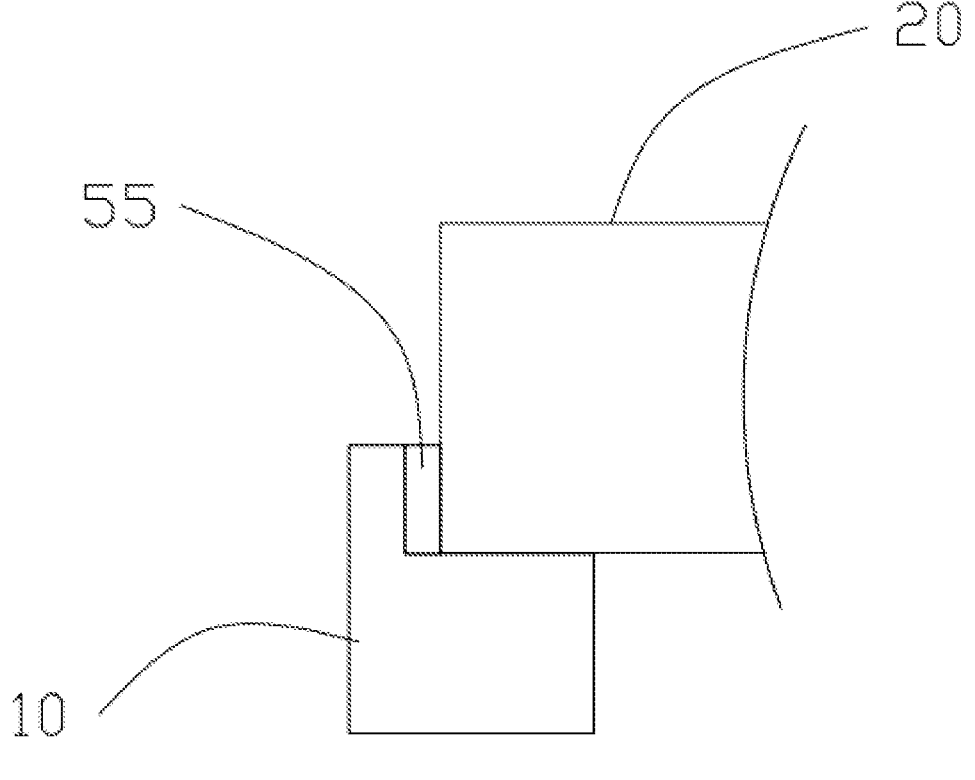
FIG. 17 is a schematic view of a third brazing method.

Referring to FIG. 17, after assembling the handle body 10 and the probe body 20, the ceramic metallization brazing material 55 is filled into the gap between the handle body 10 and the probe body 20. Then, sintering is performed after brazing. (The order of assembly and filling with ceramic metallization brazing material 55 can be reversed.)

Figure 18:
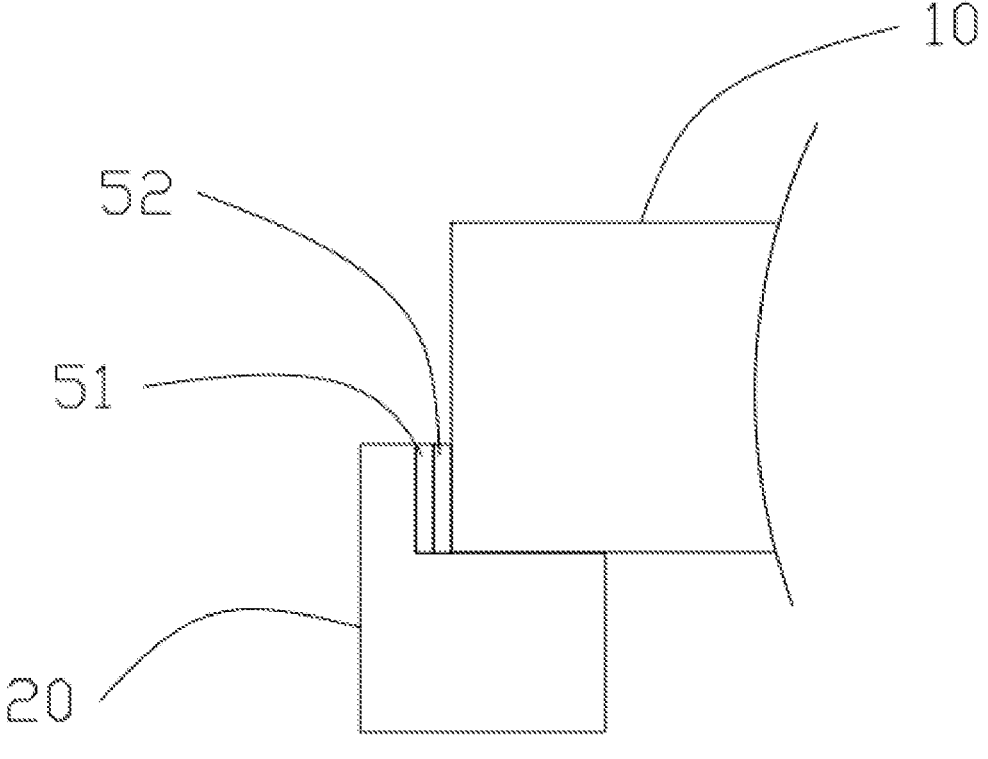
FIG. 18 is a schematic view of a fourth brazing method.
Figure 19:
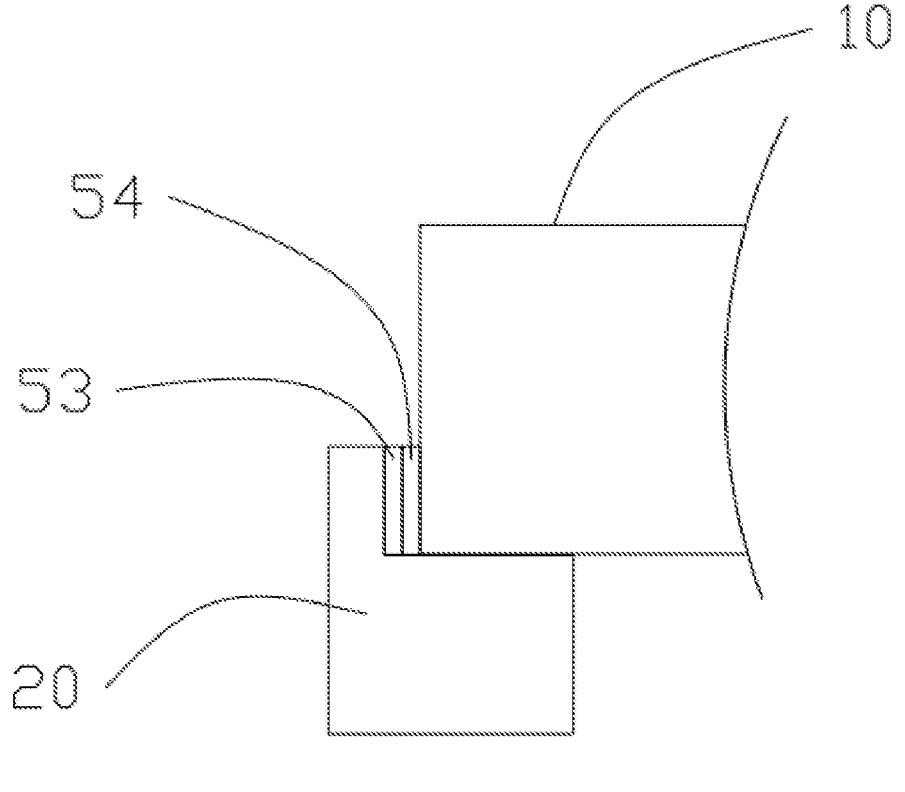
FIG. 19 is a schematic view of a fifth brazing method.
Figure 20:
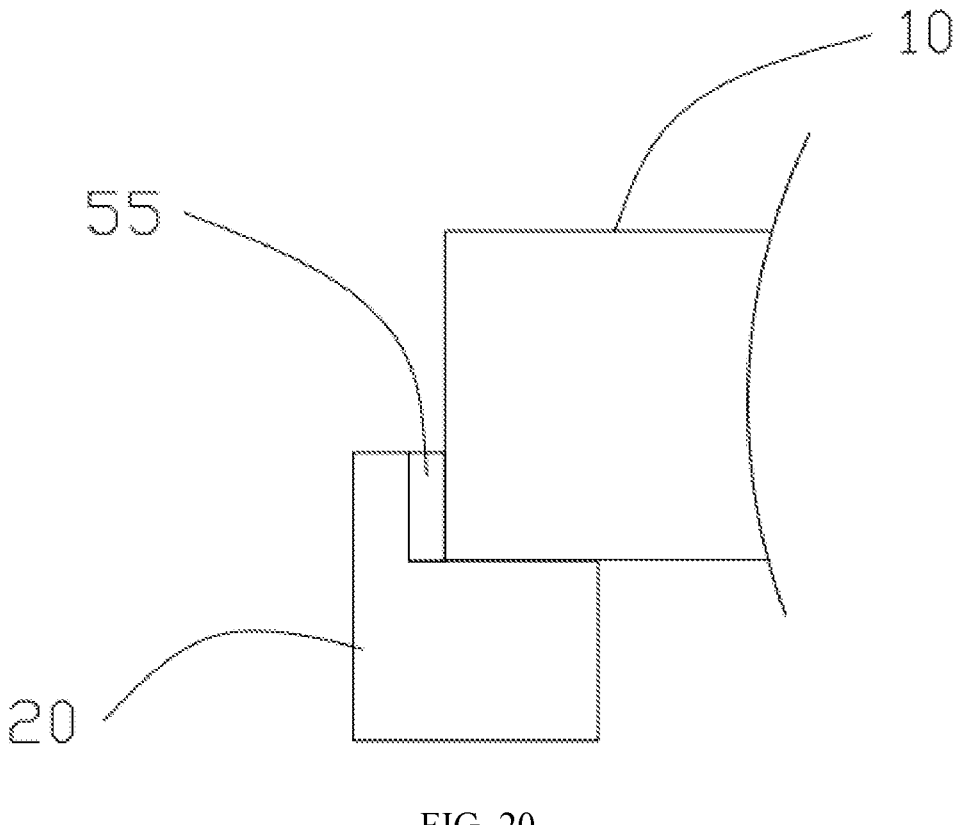
FIG. 20 is a schematic view of a sixth brazing method.

In different implementations, brazing can also be performed by wrapping one end of the probe body 20 around one end of the handle body 10. Referring to FIGS. 18, 19, and 20, respectively, the brazing method is similar to that shown in FIGS. 15, 16, and 17, and differ from the brazing method of FIGS. 15, 16, and 17 only in that the probe body 20 is on the outside and the handle body 10 is on the inside, which will not be repeated herein.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A food temperature probe, comprising: a handle body, a probe body, a first pole, a first temperature sensing element, a power supply module, an antenna, and a circuit board; a second pole being disposed on the probe body;

wherein an interior of the handle body and an interior of the probe body are communicated to form an accommodating cavity, and the handle body and the probe body are connected by brazing;

the circuit board is disposed in the accommodating cavity, and the first temperature sensing element is disposed in the accommodating cavity at an end thereof away from the handle body;

the first pole, the first temperature sensing element, the power supply module, and the antenna are electrically connected to the circuit board;

wherein the food temperature probe further comprises a transfer piece;

the first pole is connected to the handle body via the transfer piece; or the second pole is connected to the first pole via the transfer piece;

wherein when the first pole is connected to the handle body via the transfer piece, the transfer piece is brazed to the handle body, and the first pole is connected to the transfer piece through one or more of laser welding, fusion welding, cold welding, threading with glue, and threading with a sealing ring;

wherein when the second pole is connected to the first pole via the transfer piece, the food temperature probe further comprises an insulating ceramic; the first pole, the insulating ceramic and the transfer piece are brazed in sequence, and the transfer piece is connected to the probe body through one or more of laser welding, fusion welding, cold welding, threading with glue, and threading with a sealing ring.

2. The food temperature probe according to claim 1, wherein an outer diameter of an end of the probe body facing the handle body is smaller than an inner diameter of an end of the handle body facing the probe body, such that the probe body is inserted into the handle body and is brazed to the handle body;

or, an outer diameter of an end of the handle body facing the probe body is smaller than an inner diameter of an end of the probe body facing the handle body, such that the handle body is inserted into the probe body and is brazed to the probe body.

3. The food temperature probe according to claim 1, wherein when the first pole is connected to the handle body via the transfer piece, the transfer piece is disposed at an end of the handle body away from the probe body, and the first pole is disposed at an end of the transfer piece away from the handle body;

the first pole is electrically connected to the circuit board through a first pole extension wire.

4. The food temperature probe according to claim 1, wherein the first pole is connected to the handle body via the transfer piece, the first pole and the transfer piece are disposed at a middle of the handle body;

the first pole is electrically connected to the circuit board through a first pole extension wire.

5. The food temperature probe according to claim 1, wherein when the second pole is connected to the first pole via the transfer piece, an end of the probe body away from the handle body is sequentially connected to the transfer piece, the insulating ceramic, and the first pole;

the first pole is electrically connected to the circuit board through a first pole extension wire.

6. The food temperature probe according to claim 1, wherein the handle body and the probe body are brazed using a glass frit as a filler material.

7. The food temperature probe according to claim 1, wherein the handle body and the probe body are brazed using a ceramic metallization brazing material as a filler material.

8. The food temperature probe according to claim 1, further comprising a second temperature sensing element disposed in the accommodating cavity at an end thereof away from the probe body.

9. The food temperature probe according to claim 1, wherein an end of the probe body away from the handle body gradually tapers towards a direction away from the handle body, to form a pointed tip.

10. The food temperature probe according to claim 1, wherein a heat insulation film is disposed on the power supply module.

\* \* \* \* \*